United States Patent
Feldman et al.

(10) Patent No.: US 8,325,266 B2
(45) Date of Patent: *Dec. 4, 2012

(54) METHOD OF FORMING THIN CAMERA

(75) Inventors: Michael R. Feldman, Huntersville, NC (US); Robert TeKolste, Charlotte, NC (US)

(73) Assignee: Digitaloptics Corporation East, Charlotte, NC (US)

( * ) Notice: Subject to any disclaimer, the term of this patent is extended or adjusted under 35 U.S.C. 154(b) by 517 days.

This patent is subject to a terminal disclaimer.

(21) Appl. No.: 12/181,173

(22) Filed: Jul. 28, 2008

(65) Prior Publication Data
US 2008/0285965 A1 Nov. 20, 2008

Related U.S. Application Data

(62) Division of application No. 10/763,396, filed on Jan. 26, 2004, now Pat. No. 7,405,761.

(60) Provisional application No. 60/507,579, filed on Oct. 1, 2003.

(51) Int. Cl.
*H04N 5/225* (2006.01)
*G02B 27/10* (2006.01)

(52) U.S. Cl. .................... 348/340; 359/621
(58) Field of Classification Search .......... None
See application file for complete search history.

(56) References Cited

U.S. PATENT DOCUMENTS

| | | | |
|---|---|---|---|
| 5,568,197 A | 10/1996 | Hamano | |
| 5,616,912 A | 4/1997 | Robinson et al. | |
| 5,682,203 A | 10/1997 | Kato | |
| 5,757,423 A | 5/1998 | Tanaka et al. | |
| 5,760,832 A | 6/1998 | Yamanaka et al. | |
| 5,768,023 A * | 6/1998 | Sawaki et al. | 359/622 |
| 5,956,163 A * | 9/1999 | Clarke et al. | 358/509 |
| 6,137,535 A | 10/2000 | Meyers | |
| 6,330,112 B1 * | 12/2001 | Kaise et al. | 359/621 |
| 6,611,289 B1 | 8/2003 | Yu et al. | |
| 6,632,701 B2 | 10/2003 | Merrill | |
| 6,717,734 B2 * | 4/2004 | Fujimoto | 359/619 |
| 6,882,364 B1 | 4/2005 | Inuiya et al. | |
| 6,894,840 B2 * | 5/2005 | Yamanaka et al. | 359/619 |

(Continued)

FOREIGN PATENT DOCUMENTS

WO WO 03/024090 3/2003

(Continued)

OTHER PUBLICATIONS

Tanida, et al., "Color Imaging with an Integrated Compound Imaging System", Optics Express, vol. 11, No. 18, pp. 2109-2117 (Sep. 8, 2003).

(Continued)

*Primary Examiner* — Ngoc-Yen Vu
(74) *Attorney, Agent, or Firm* — Lee & Morse, P.C.

(57) ABSTRACT

A thin camera having sub-pixel resolution includes an array of micro-cameras. Each micro-camera includes a lens, a plurality of sensors of size p, and a plurality of macro-pixels of size d having a feature of size q. The feature size q smaller than p and provides a resolution for the micro-camera greater than p. The smallest feature in the micro-cameras determines the resolution of the thin camera. Each macro-pixel may have any array of m features of size q, where q=d/m. Additional micro-cameras may be included to increase power.

21 Claims, 3 Drawing Sheets

U.S. PATENT DOCUMENTS

| | | | |
|---|---|---|---|
| 6,912,090 B2 * | 6/2005 | Kornblit et al. | 359/619 |
| 7,009,652 B1 | 3/2006 | Tanida et al. | |
| 7,034,866 B1 | 4/2006 | Colmenarez et al. | |
| 7,453,510 B2 * | 11/2008 | Kolehmainen et al. | 348/340 |
| 7,551,358 B2 * | 6/2009 | Lee et al. | 359/621 |
| 2002/0089596 A1 | 7/2002 | Suda | |
| 2002/0163582 A1 | 11/2002 | Gruber et al. | |
| 2002/0181126 A1 | 12/2002 | Nishioka | |
| 2004/0008417 A1 * | 1/2004 | Shimizu et al. | 359/619 |
| 2005/0104991 A1 | 5/2005 | Hoshino et al. | |
| 2005/0128335 A1 * | 6/2005 | Kolehmainen et al. | 348/340 |
| 2005/0242410 A1 | 11/2005 | Groot et al. | |
| 2005/0248680 A1 | 11/2005 | Humpston | |
| 2005/0258350 A1 | 11/2005 | Van Arendonk | |
| 2006/0044450 A1 | 3/2006 | Wolterink et al. | |

FOREIGN PATENT DOCUMENTS

WO    WO 2005/041561    5/2005

OTHER PUBLICATIONS

"Thin observation module by bound optics (TOMBO): concept and experimental verification", Applied Optics, vol. 40, No. 11 (Apr. 10, 2001).

* cited by examiner

METHOD OF FORMING THIN CAMERA

CROSS REFERENCE TO RELATED APPLICATION

This is a divisional application based on pending application Ser. No. 10/763,396, filed Jan. 26, 2004, the entire contents of which is hereby incorporated by reference.

BACKGROUND

There is a need for a thin camera or imaging system for many applications. An approach to realizing a thin camera with sufficient resolution involves scaling an imaging system of a conventional camera 10, shown in FIG. 1, down by some factor. In the following example, the conventional camera is an f/1 camera having a lens 12 with a focal length f, here a 4 mm focal length, and a detector array 14, here having 200×200 pixels with 20 microns per pixel. The resolution of this camera is given by 1/(20 microns) or 50 lines per mm. The desired scaling factor in this example is ten. The resulting scaled down thin camera 20, shown in FIG. 2, includes a micro-lens 22, here having a 400-micron focal length and a micro-detector array 24, here being a 200×200 array of 2 microns per pixel. Here the pixels are assumed to have the same dimension in both the x- and y-direction.

More generally, assume the focal plane has $n_x$ pixels or sensors of a size $p_x$ in the x-direction and $n_y$ pixels of size $p_y$ in the y-direction. The resolution is then defined as $1/p_x$ in the x-direction and $1/p_y$ in the y-direction. If $p_x$ and $p_y$ could be reduced by a desired scaling factor, thus keeping $n_x$ and $n_y$ the same, as noted above, then f could be reduced by an order of magnitude, while maintaining the resolution. However, this scaled down pixel size may be limited by availability and/or price of current sensors. Further, there is not enough power in such a scaled down system. In the above example shown in FIG. 2, the scaled version only has about $1/100^{th}$ of the power of the original camera.

SUMMARY OF THE INVENTION

It is a feature of an embodiment of the present invention to provide a thin camera having sub-pixel resolution. It is another feature of an embodiment of the present invention to include a thin camera having sufficient power.

At least one of the above and other features of the present invention may be realized by providing an imaging system having an array of lenses, a plurality of sensors for each lens, and a plurality of macro-pixels of size $d_x d_y$. Each sensor has a single detection element of size $p_x p_y$, with the center-to-center spacing of the sensor elements being $d_x$ in the x-direction and $d_y$ in the y-direction. The plurality of sensors are adjacent to an image plane of a corresponding lens. Each macro-pixel corresponds to a sensor and is between the corresponding lens and the sensor. Each macro-pixel has $m_x m_y$ micro-pixels, each micro-pixel being of size $d_x/m_x * d_y/m_y$ and having one of a high and a low transmittance function. Light transmitted through each lens and directed towards a sensor will impinge on the sensor after multiplication by the transmittance of the macro-pixel. The imaging system has a resolution in the image plane of greater than $1/p_x$ in the x-direction or $1/p_y$ in the y-direction.

A number of lenses in the x-direction may be different from the number of lenses in the y-direction. The lens may be formed on one side of a substrate and the filter is formed on an opposite side of the substrate or the filter may be formed on the lens. The lens may include a substrate having parallel surfaces, an optical element being formed on at least one of the parallel surfaces. The lens may include at least two substrates having parallel surfaces, at least two optical elements, each optical element being formed on a different surface of the at least two of the parallel surfaces. One optical element of the least two optical elements may be a diffractive optical element, which may correct for aberration of the lens. The at least two substrates for an array of lenses are bonded together or may have a spacer between them. Each lens may be a polygonal lens and corresponding macro-pixels and sensors may fill in similarly sized area to that of the polygonal lens.

At least part of or a majority of a path between the lens and the array of macro-pixels may have a refractive index greater than one. One filtering element may allow all the light incident thereon to impinge on the macro-pixel. Different color filters may be in paths of corresponding macro-pixels. The size of the sensor and the macro-pixel may be equal, e.g. $d_x d_y = p_x p_y$.

BRIEF DESCRIPTION OF THE DRAWINGS

The above and other features and advantages of the present invention will become readily apparent to those of skill in the art by describing in detail embodiments thereof with reference to the attached drawings, in which.

DETAILED DESCRIPTION

Figure 1:
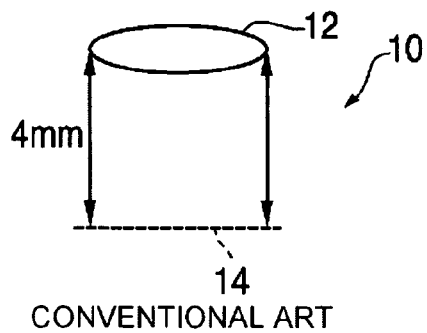
FIG. 1 is a schematic side view of an imaging system in a conventional camera.

U.S. Provisional Application No. 60/507,579, filed on Oct. 1, 2003, and entitled: "THIN CAMERA" is incorporated herein by reference in its entirety.

The present invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the concept of the invention to those skilled in the art. In the drawings, the thickness of layers and regions are exaggerated for clarity. It will also be understood that when a layer is referred to as being "on" another layer or substrate, it may be directly on the other layer or substrate, or intervening layers may also be present. Further, it will be understood that when a layer is referred to as being "under" another layer, it may be directly under, or one or more intervening layers may also be present. In addition, it will also be understood that when a layer is referred to as being "between" two layers, it may be the only layer between the two layers, or one or more intervening layers may also be present. Like numbers refer to like elements throughout.

As noted above, attempting to realize a thin camera with sufficient resolution by scaling down a conventional camera results in two problems. First, the pixel size required may be smaller than available and/or such small pixel size, even if available, may not be practical. Second, the power in the system is reduced. The second problem of adequate power may be partially addressed by providing an array of these thin cameras that is at least the scaling factor in the x- and y-directions, here a 10×10 array of the thin cameras. While this expands the x, y dimensions back to those of the conventional camera, the z-direction is maintained, i.e., the camera remains thin.

Figure 2:
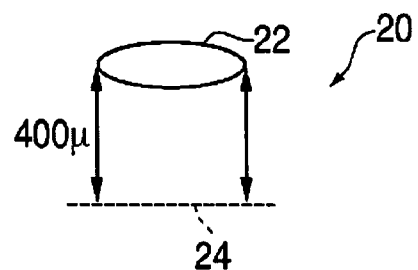
FIG. 2 is a schematic side view of the scaled down imaging system of the conventional camera.

The first problem of pixel size is more difficult to address. One solution, shown in FIG. 3, uses a plurality $n_x n_y$ of macro-pixels 34 of size $d_x d_y$, one macro-pixel 34 for each sensor 36. Each macro-pixel 34 serves as a filter and has a feature 32. Each macro-pixel is between the micro-lens 22 (shown in FIG. 2) and the sensors 36. The macro-pixel size $d_x d_y$ may be the same as or greater than the pixel or sensor size $p_x p_y$. All or most of the light transmitted through each macro-pixel 34 may be directed on to the corresponding sensor 36. The transmittance of each macro-pixel 34 may vary across the macro-pixel 34. This variation in transmittance can be described by dividing the macro-pixel 34 into micro-pixels, which serve as the features 32. The transmittance of each micro-pixel 32 may be uniform. Each macro-pixel 34 has m micro-pixels 32 of size q. More generally, there are $m_x$ micro-pixels 32 of a size $q_x$ in the x-direction and $m_y$ micro-pixels of size $q_y$ in the y-direction. Thus, the power incident on each sensor 36 is equal to a summation, over all micro-pixels 32 on the corresponding macro-pixel 34, of the power on each micro-pixel 32 multiplied by the transmittance of the micro-pixels 32.

Figure 3:
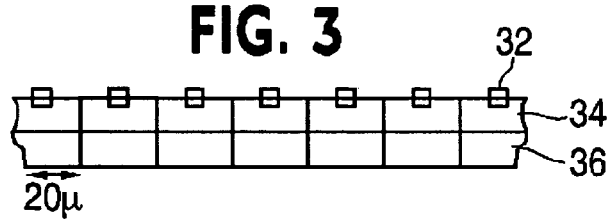
FIG. 3 is a schematic exploded side view of a macro-pixel/micro-pixel configuration for use in a micro-camera of an embodiment of the present invention.

In the first embodiment of FIG. 3, each micro-pixel may either be open or closed, i.e., have a transmission of one or zero, and only one of the $m_x \times m_y$ micro-pixels in each macro-pixel is open. For this case, consider $m_x=m_y=10$, giving 100 micro-pixels 32 per macro-pixel 34. Also, consider the same sensor size of 20×20 microns as the conventional camera discussed above, and a f/1 lens with a 400 micron focal length. Then, the size of the lens is also 400 microns, e.g., the lens has a 400 micron diameter if it is spherical and a 400 micron width if it is square. Since the camera will be arrayed, it is desirable to limit the sensor elements 36 to within approximately the same dimensions as the lens size, so that there will be no dead space between lenses in the array. That limits the size of the sensor array to approximately 400 microns in diameter, and thus the number of sensors 36 to a 20×20 array. In this case, the resolution of the camera is now equal to $1/q_x \times 1/q_y$. However, the result is a sampled image, i.e., the image would contain 20×20 samples of a 200×200 pixel image.

Figure 4:
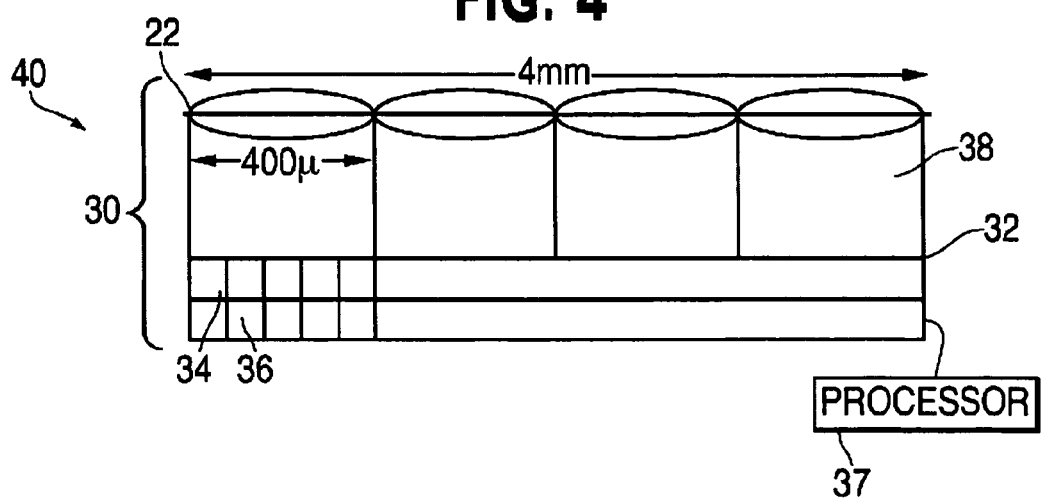
FIG. 4 is a schematic side view of an array of micro-cameras using the macro-pixel/micro-pixel combination of FIG. 3.

The remaining pixels can be obtained by forming an array of micro-cameras. As shown in FIG. 4, a thin camera 40 includes an array of micro-cameras 30. Each micro-camera 30 includes a micro-lens 22, a plurality of sensors 36, and a plurality of macro-pixels 34 having a feature 32. The number of micro-lenses 1 may be different in the x-direction than the y-direction, i.e., $1_x$, $1_y$. The macro-pixels 34 may be located at an image plane of the micro-camera 30. The number $n_x$, $n_y$ of macro-pixels 34 and sensors 36 is determined by the selected size $p_x$, $p_y$ of the pixel and the size of the image at the image plane. All of these elements may be unitary devices, with the micro-cameras 30 being defined by individual micro-lenses 22.

The plurality of macro-pixels 34 having the features 32 may be placed closer to the plurality of sensors 36 than to the micro-lens 22. If the lens 22 is a lens system of more than one lens, then the plurality of macro-pixels 34 having the features 32 may be closer to the sensors 36 or to the focal plane of the lens system that to a first principal plane of the lens systems. The feature 32 may be within the depth of focus of the micro-lens 22 or lens system.

For the first embodiment set forth above, the thin camera 40 would include a 10×10 array of micro-cameras 30. Assume that the lens 22 for each micro-camera 30 forms the same image on the back focal plane of each micro-camera 30. Then, the open micro-pixels 32 are located in different locations on each micro-camera 30 so that each micro-camera 30 generates a different set of 20×20 samples of the 200×200 pixel image. By combining all the samples form each micro-camera together the full 200×200 pixels of the entire image can be generated.

In this manner, the resolution of the micro-camera is equal to $1/q_x \times 1/q_y$, rather than $1/p_x \times 1/p_y$ for a conventional camera. In this example, the camera resolution would be 500 lines/mm (½ microns), rather than 50 lines/mm in a conventional camera.

Of course, this is the resolution in the back focal plane of the lens, or, more generally, in the image plane of the micro-camera 30. In the above example, the result is a thin camera that works similarly to the conventional camera, while having one-tenth the thickness. Such a thin camera has a higher resolution in the image plane by a factor of ten, but because the focal length is reduced the images appearing in the image plan are smaller. Thus, the higher resolution is needed to get comparable performance to a conventional camera. That is, in comparing to a conventional camera in FIG. 1, one could image a particular scene to fit on to the sensor array in FIG. 1. The sensor array would generate 200×200 pixels with 50 lines/mm resolution. With the thin camera as outlined above with reference to FIGS. 3 and 4, this same scene would be imaged on to each 20×20 sensor array of each camera. Each of these scenes would be one-tenth the size (in each dimension) but would be sampled with ten times the resolution of the conventional scenes, so that the net result would be the same 200×200 image.

Although each scene is described above as being identical for each micro-camera, this is not necessarily the case. The scenes could be slightly different and the micro-pixel 32 locations adjusted as long as how the scene changes between micro-cameras 30 is known.

This resulting thin camera then has very comparable performance to the camera of FIG. 1. However, although the power incident on this thin camera is comparable to the power incident on the camera of FIG. 1, 99% of the light is blocked by the macro-pixels 34, in this first embodiment.

The power issue can be addressed by noting that a sub-image is located on each macro-pixel 34 of each micro-camera 30. This sub-image contains $m_x m_y$ pixels, or, in the case of this example, a 10×10 array of pixels. There are many known ways to decompose such an image in to basis sets. A basis set allowing more than one micro-pixel transmitted per sub-image may be used. For example, the basis set may allow transmission of 50% of the micro-pixels 32 in each sub-image. Such a basis set would allow transmission of approximately 50% of the light incident on the thin camera 40. Each sub-image is sampled one hundred times, i.e., once for each micro-camera 30, so any basis set with one hundred components can be used.

Each micro-camera is to look at different apertures, i.e., each micro-camera is taking a picture of the same thing and the resultant data is merged in software. In other words, for this particular example, a minimum of one hundred components, i.e., one component for each of the micro-cameras 30 in the array, will be needed. In this manner, information from corresponding macro-pixels in different micro-cameras is combined to create the image having sub-pixel resolution. As shown in FIG. 4, a processor 37, such as a processing chip, may be used to electrically combine the outputs from the sensors 36.

While the example above has a open micro-pixel of size q for each macro-pixel, as long as there are $n_x n_y$ sensors for the camera viewing each portion of the image with a filter having a feature with a desired minimum feature size q, the desired resolution may be realized. While the ideal black and white image solution was noted above, i.e., the micro-pixels having a transmittance function that is either one or zero, the micro-pixels 32 may more generally be assigned high transmittance and low transmittance for a particular wavelength. High transmittance is greater than 0.5 and low transmittance is less than 0.5, and the difference between high transmittance and low transmittance may be at least a factor of two.

The mask forming the micro-pixels 32 may be an array of pinholes on a flat surface. For example, the micro-pixels 32 may be patterned pinholes on the backside of the lenses 22. The micro-pixels 32 will typically lie in the focal plane of the lens 22. In the particular example shown in FIG. 4, there is a substrate 38, e.g., of fused silica, between the micro-lenses and the macro-pixels. The substrate 38 may have patterned pinholes, e.g., in an absorptive layer on the back of the surface thereof serving as the micro-pixels 32. Examples of absorptive materials include black chrome and color filters. Examples of reflective materials include metal and dielectric thin film stacks.

It is further noted that the use of the substrate 38 provides a refractive index greater than that of air. Materials having higher refractive indices may be used to reduce the effective wavelength. This reduces the diffraction limited point spread function on the focal plane and improves resolution. To reduce the effective wavelength, the material needs to be between a surface having optical power and the focal plane, preferably very close to the focal plane.

For small f/# lenses, it may be difficult to provide diffraction limited images over the field of view required. In this case it is sometimes easier to focus the light on to a curved surface. In this manner, the backside of the lens array could be etched into curved surfaces centered on each lens. Or the back surface could be etched in a series of discrete rings approximating a curved surface. The holes would then be provided on this curved or other non-flat surface. Providing the holes on a curved or other non-flat surface helps insure the image is diffraction limited across a wide field.

Figure 5:
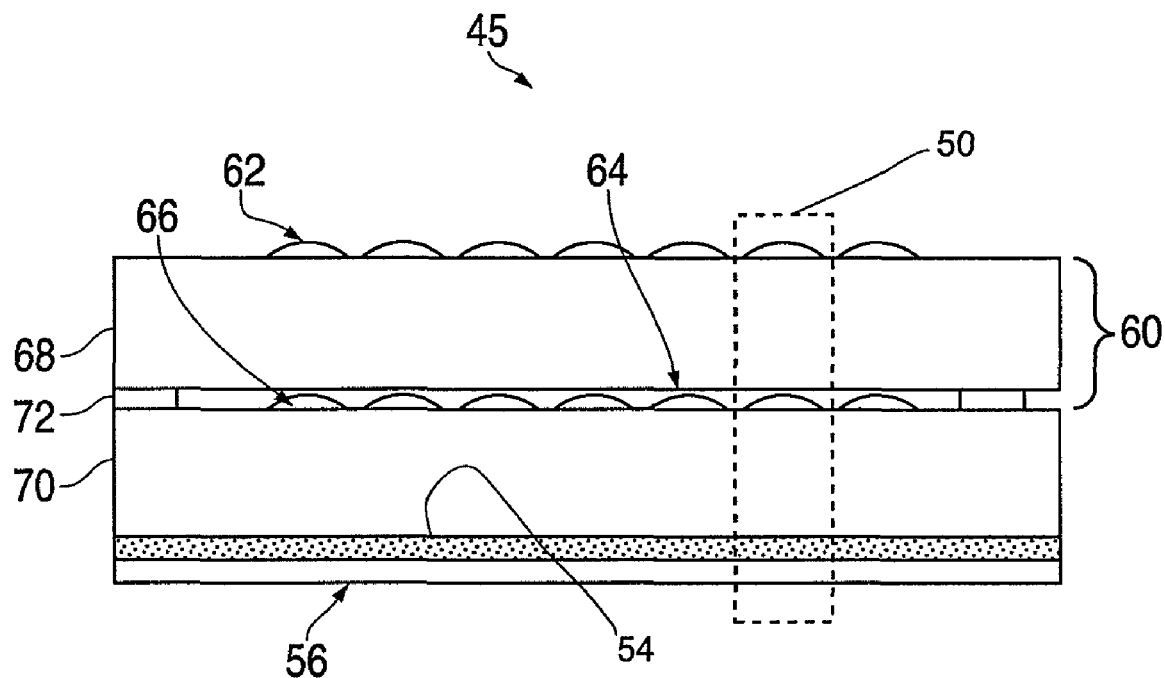
FIG. 5 is a schematic side view of an array of micro-cameras according to another embodiment of the present invention.

In achieving diffraction-limited resolution over a wide field of view, optical power may be needed on multiple surfaces. As shown in FIG. 5, an array 45 of micro-cameras 50 has an array of optical systems 60 rather than an array of micro-lenses 22. Each micro-camera 50 includes an optical system 60, a subset of the array of macro-pixels 54 and a subset of the array of sensors 56. The macro-pixel array 54 may include the array of micro-pixels 32 noted above as features therein.

The array of optical systems 60 may include a plurality of substrates 68, 70, which may be separated by a spacer 72. The spacer 72 may be integral with one of the substrates 68, 70 or may be formed on a separate spacer substrate. In the particular embodiment shown, the optical system 60 includes a portion of the substrate 68, a portion of the substrate 70, a first refractive lens 62 on a top surface of the corresponding portion of the substrate 68, a diffractive lens 64 on a bottom surface of the corresponding portion of the substrate 68, and a second refractive lens 66 on a top surface of the corresponding portion of the substrate 70. The diffractive lens 64 may correct for aberrations.

Here, the macro-pixel array 54 is provided on or adjacent to a bottom surface of the substrate 72. Additional substrates providing additional surfaces with optical power therein may be provided in a similar fashion as dictated by the requirements of the optical system 60. The substrates 68 and 70 may have surfaces parallel with one another and may be bonded together on across the array as shown in FIG. 5.

Figure 6:
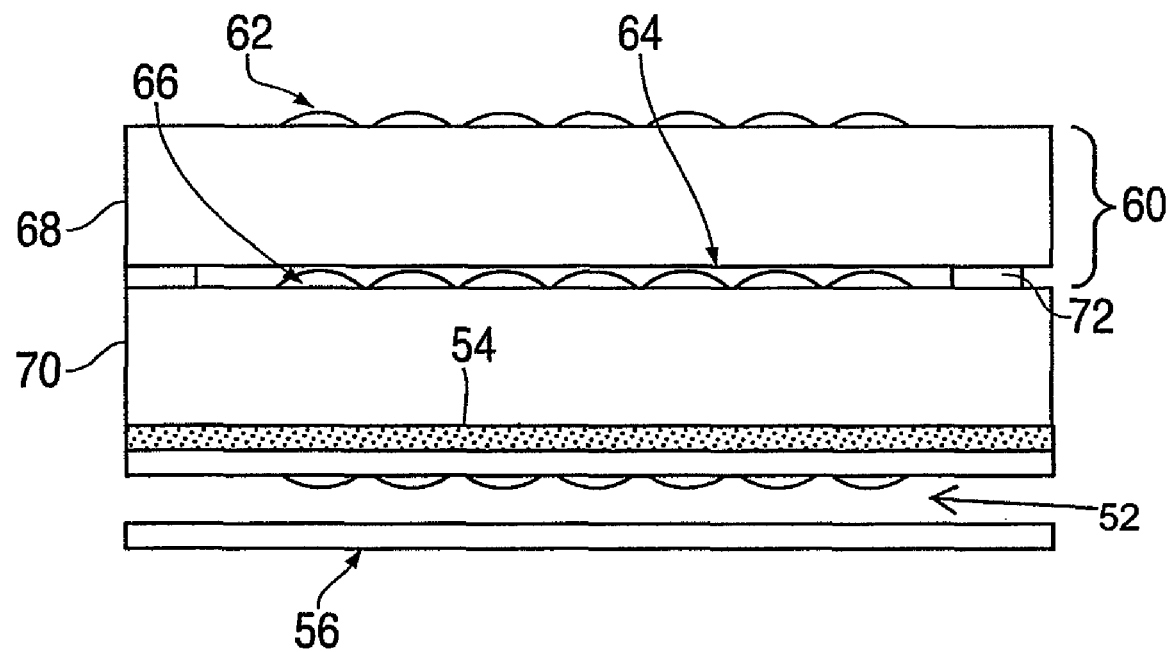
FIG. 6 is a schematic side view of an array of micro-cameras according to another embodiment of the present invention.

Another imaging system 80 is shown in FIG. 6. Here, sensors in a detector plane 56 are too far from the macro-pixels 54 to receive all of the light transmitted therefrom. In order to address this, another array of lenses 52 is provided for imaging the output of the macro-pixels 54 onto the sensors in the detector plane 56.

Color images may be realized with the thin camera 40 by placing different color filters, e.g., red, green and blue, in the path of different macro-pixels. Typically, three color filters are required, so each color filter may be in a path of a third of the macro-pixels. Since the eye is more sensitive to green, in many cases more green filters are used than red and blue, e.g., 25% of the pixels have blue and red filters and 75% have green filters.

Alternatively to having a single micro-pixel shifted for each macro-pixel, multiple holes or micro-pixels may be open per macro-pixel. As noted above, when all of the micro-pixels in the array of micro-pixels are open, no light is blocked to the macro-pixel. If only one of the micro-pixels is open, the desired resolution is realized on the corresponding macro-pixel. Thus, the image can be decomposed by the micro-cameras in a variety of manners, as long as all of the information for each macro-pixel is captured. The ratio of the size of each macro-pixel to the size of each micro-pixel may be proportional to a number of micro-cameras in the thin camera. Some arrays of micro-pixels may allow all light in a macro-pixel to pass through, giving an average value of the intensity for that macro-pixel. Typically, most macro-pixels will have at least half of the micro-pixels open. Further, a gray scale approach, where each micro-pixel is assigned a transmittance that may vary between micro-pixels. Then, rather than referring to the micro-pixels as being open and closed, the macro-pixel would receive some level of transmittance. For example, at least 20% of the micro-pixels in a majority of the macro-pixels may have transmittances greater than 0.4.

Available lens array technology may be used to manufacture the lenses rather than conventional discrete element lens technology. Examples of lens array fabrication technologies include reactive ion etching, wet etching and other lithographic manufacturing techniques, as well as replication techniques. Such array manufacturing technologies allow quite readily for the fabrication of rectangular lenses and lens arrays (as well as other polygons, such as hexagons) which reduces the dead space between lenses in lens arrays as compared to circular lenses. Typically the macro-pixels and sensor arrays associated with each micro-camera will have approximately the same shape and size as the corresponding lens. For example, if hexagonal lenses are used, then the macro-pixels and sensor elements associated with the hexagonal lens would fill approximately the same hexagonal space (in two-dimensions) as the lens.

Thus, the thin camera is realized by scaling down a conventional camera to a micro-camera and creating an array of micro-cameras scaled back up in the x- and y-dimension to that of the conventional camera. The z-dimension of the micro-cameras remains the same as in the scaled down version, thus reducing the thickness of the resultant camera by the scaling factor relative to the conventional camera. A filter element having a minimum feature size defining the resolution of the thin camera is provided within the depth of focus of the micro-lens to obtain a desired resolution. Additional micro-cameras may be included to insure sufficient power.

Embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of forming an imaging system, the method comprising:
    forming a first array of first lenses on a first surface of a first substrate;
    forming a second array of second lenses on a second surface of a second substrate, each second lens corresponding to a first lens of the first array along a light path of the imaging system;
    securing first and second substrates to each other along a first direction parallel to the light path, at least one of the first surface of the first substrate and the second surface of the second substrate facing an opposing substrate, securing including directly attaching a spacer to the first and second substrates at opposing surfaces, the spacer separating the first and second substrates along the first direction; and
    aligning a plurality of sensors for each pair of first and second lenses adjacent to an image plane of a corresponding pair of first and second lenses.

2. The method as claimed in claim 1, the spacer between the first and second substrates is separate from the first and second substrates.

3. The method as claimed in claim 1, wherein securing first and second substrates includes securing the first surface on the first substrate to a third surface on the second substrate, the third surface being opposite the second surface.

4. The method as claimed in claim 1, wherein the second array of second lenses is immediately adjacent the plurality of sensors.

5. The method as claimed in claim 1, wherein at least one of forming the first and second arrays includes replicating.

6. The method as claimed in claim 1, wherein the spacer is integral with at least one of the opposing surfaces.

7. A method of forming an imaging system, the method comprising:
    forming a first array of first lenses on a first surface of a first substrate;
    forming a second array of second lenses on a second surface of a second substrate, each second lens corresponding to a first lens of the first array along a light path of the imaging system;
    securing first and second substrates to each other along a first direction parallel to the light path, at least one of the first surface of the first substrate and the second surface of the second substrate facing an opposing substrate;
    aligning a plurality of sensors for each pair of first and second lenses adjacent to an image plane of a corresponding pair of first and second lenses; and
    providing a plurality of macro-pixels of size $d_x d_y$, each macro-pixel corresponding to a sensor and being between the corresponding pair of first and second lenses and the sensor, each macro-pixel having $m_x m_y$ micro-pixels, each micro-pixel being of size $d_x/m_x * d_y/m_y$, and having one of a high and a low transmittance function, wherein
    each sensor has a single detection element of size $m_y$, with the center-to-center spacing of the detection elements being $d_x$ in the x-direction and $d_y$ in the y-direction,
    light transmitted through each lens pair and directed towards a sensor will impinge on the sensor after multiplication by the transmittance of the macro-pixel, and
    the imaging system has a resolution in the image plane of greater than $1/p_x$ in the x-direction or $1/p_y$ in the y-direction.

8. The method as claimed in claim 7, wherein a ratio of a size of each macro-pixel to a size of each micro-pixel is proportional to a number of first lenses in the first array of first lenses.

9. The method as claimed in claim 7, wherein the plurality of macro-pixels is formed on a fourth side of the first substrate, opposite the first substrate.

10. The method as claimed in claim 7, wherein the plurality of macro-pixels is formed at least one of the plurality of first lenses.

11. The method as claimed in claim 7, wherein the size $d_x/m_x * d_y/m_y$ is on an order of a desired resolution of the imaging system.

12. A method of forming an imaging system, the method comprising:
    forming an array of lenses on a substrate;
    providing a plurality of sensors for each lens, each sensor having a single detection element of size $p_x p_y$, with the center-to-center spacing of the detection elements being $d_x$ in the x-direction and $d_y$ in the y-direction, the plurality of sensors being adjacent to an image plane of a corresponding lens; and
    providing a plurality of macro-pixels of size $d_x d_y$, each macro-pixel corresponding to a sensor and being between the corresponding lens and the sensor, each macro-pixel having $m_x m_y$ micro-pixels, each micro-pixel being of size $d_x/m_x * d_y/m_y$, and having one of a high and a low transmittance function,
    wherein light transmitted through each lens and directed towards a sensor will impinge on the sensor after multiplication by the transmittance of the macro-pixel, and
    wherein the imaging system has a resolution in the image plane of greater than $1/p_x$ in the x-direction or $1/p_y$ in the y-direction.

13. The method as claimed in claim 12, wherein a ratio of a size of each macro-pixel to a size of each micro-pixel is proportional to a number of first lenses in a first array of first lenses.

14. The method as claimed in claim 12, wherein the size $d_x/m_x * d_y/m_y$ is on an order of a desired resolution of the imaging system.

15. The method as claimed in claim 12, wherein the lens is formed on one side of the substrate and the plurality of macro-pixels is formed on an opposite side of the substrate.

16. The method as claimed in claim 12, wherein providing the plurality of macro-pixels includes forming the plurality of macro-pixels on at least one of the plurality of lenses.

17. The method as claimed in claim 12, wherein the lens includes a substrate having parallel surfaces, an optical element being formed on at least one of the parallel surfaces.

18. The method as claimed in claim 12, wherein forming the lens includes providing at least two substrates having parallel surfaces and forming at least two optical elements, each optical element being formed on a different surface of the at least two of the parallel surfaces.

19. The method as claimed in claim 18, wherein one optical element of the least two optical elements is a diffractive optical element.

20. The imaging system as recited in claim 19, wherein the diffractive optical element corrects for aberration of the lens.

21. The method as claimed in claim 18, wherein the at least two substrates for an array of lenses are bonded together.

* * * * *